(12) United States Patent
Hostetter et al.

(10) Patent No.: US 11,056,144 B2
(45) Date of Patent: *Jul. 6, 2021

(54) SYSTEM AND METHOD FOR WRITE PROTECTING PORTIONS OF MAGNETIC TAPE STORAGE MEDIA

(71) Applicant: Oracle International Corporation, Redwood Shores, CA (US)

(72) Inventors: David G. Hostetter, Louisville, CO (US); John Steven Herron, Arvada, CO (US)

(73) Assignee: Oracle International Corporation, Redwood Shores, CA (US)

( * ) Notice: Subject to any disclaimer, the term of this patent is extended or adjusted under 35 U.S.C. 154(b) by 195 days.

This patent is subject to a terminal disclaimer.

(21) Appl. No.: 16/383,126

(22) Filed: Apr. 12, 2019

(65) Prior Publication Data

US 2019/0237103 A1    Aug. 1, 2019

Related U.S. Application Data

(63) Continuation of application No. 15/263,991, filed on Sep. 13, 2016, now Pat. No. 10,262,686, which is a
(Continued)

(51) Int. Cl.
*G06F 11/00* (2006.01)
*G11B 15/04* (2006.01)
(Continued)

(52) U.S. Cl.
CPC ............ *G11B 15/04* (2013.01); *G06F 3/0619* (2013.01); *G06F 3/0659* (2013.01); *G06F 3/0682* (2013.01); *G11B 5/00813* (2013.01); *G11B 5/00821* (2013.01); *G11B 27/032* (2013.01); *G11B 27/36* (2013.01); *G11B 5/86* (2013.01); *G11B 2220/41* (2013.01); *G11B 2220/655* (2013.01); *G11B 2220/90* (2013.01)

(58) Field of Classification Search
CPC ....... G06F 2212/261; G06F 2212/7201; G06F 2212/7206; G06F 2221/2101; G06F 2221/2107; G06F 3/0604; G06F 3/0631; G06F 3/0643; G06F 3/0644; G06F 3/0649; G06F 3/0659; G06F 3/067; G06F 3/0679; G06F 8/65; G06F 8/654; G06F 9/4401; G06F 9/4406; G06F 9/5027; G11B 15/04
See application file for complete search history.

(56) References Cited

U.S. PATENT DOCUMENTS 5,485,321 A    1/1996    Leonhardt et al.
5,684,785 A    11/1997   Itami et al.
(Continued)

*Primary Examiner* — Amine Riad
(74) *Attorney, Agent, or Firm* — Invoke

(57) ABSTRACT

A non-transitory computer readable storage medium includes a tape having a plurality of partitions configured for storing data, and a plurality of read-only partition identifiers, each read-only partition identifier associated with one of the plurality of partitions and readable by a tape drive having a processor and memory for writing and reading tape data. Each read-only partition identifier selectively designates a corresponding one of the partitions as read-only to prevent data from being written to the designated read-only partition by the tape drive.

24 Claims, 4 Drawing Sheets

Related U.S. Application Data continuation of application No. 13/018,192, filed on Jan. 31, 2011, now Pat. No. 9,472,233.

(51) Int. Cl.
  *G11B 5/008* (2006.01)
  *G11B 27/032* (2006.01)
  *G06F 3/06* (2006.01)
  *G11B 27/36* (2006.01)
  *G11B 5/86* (2006.01)

(56) References Cited

U.S. PATENT DOCUMENTS

| | | |
|---|---|---|
| 6,674,596 B1 | 1/2004 | Takayama |
| 7,075,874 B2 | 7/2006 | Rushton et al. |
| 2005/0235103 A1 | 10/2005 | Saliba et al. |
| 2005/0251695 A1 | 11/2005 | Jaquette et al. |
| 2007/0153585 A1 | 7/2007 | Blum |
| 2008/0244171 A1 | 10/2008 | Ashton et al. |
| 2013/0124793 A1* | 5/2013 | Gyl .................... G06F 12/0246 711/103 |
| 2018/0088826 A1* | 3/2018 | Suzuki ................ G06F 3/0608 |

* cited by examiner

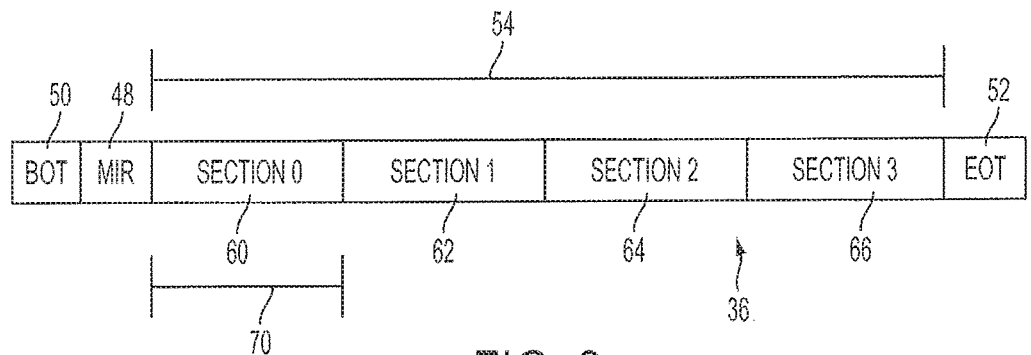
FIG. 2
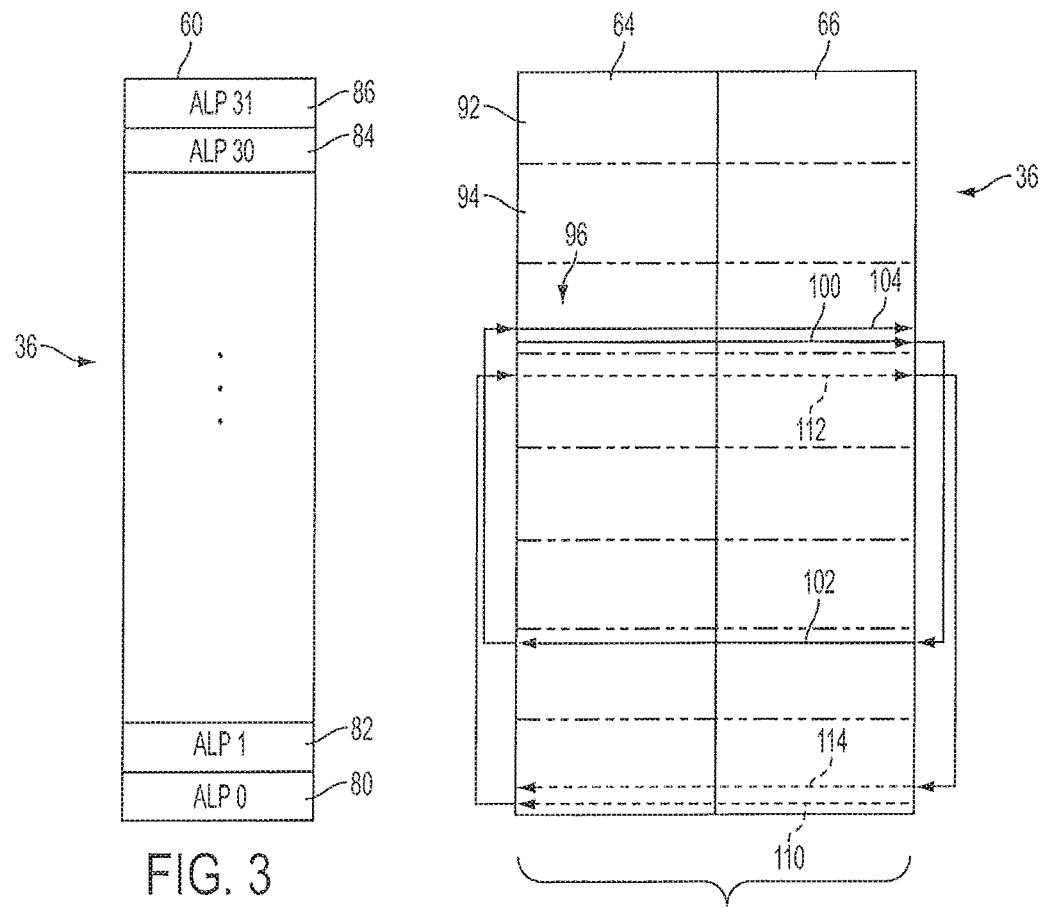
FIG. 3
FIG. 4

SYSTEM AND METHOD FOR WRITE PROTECTING PORTIONS OF MAGNETIC TAPE STORAGE MEDIA

INCORPORATION BY REFERENCE; DISCLAIMER

Each of the following applications are hereby incorporated by reference: application Ser. No. 15/263,991 filed on Sep. 13, 2016; application Ser. No. 13/018,192 filed on Jan. 31, 2011. The Applicant hereby rescinds any disclaimer of claim scope in the parent applications or the prosecution history thereof and advises the USPTO that the claims in this application may be broader than any claim in the parent applications.

TECHNICAL FIELD

The present disclosure relates to systems and methods for providing write-protection to portions of tape storage media.

BACKGROUND

Network servers and other host computers may use different types of peripheral storage devices having different capacities, access times, and other operating characteristics suitable for various applications. Enterprise and data center solutions may employ multiple complementary data storage devices to achieve desired data availability, reliability, security, long-term accessibility, and cost effectiveness, among other considerations. Many networks use an automated schedule to archive data for long-term storage. Long-term storage devices may be implemented using a wide variety of storage technologies including magnetic and optical disk drives, solid-state drives, tape drives, or other types of storage devices. However, compromises among performance, capacity, and cost are often required. Tape drives continue to provide cost-effective, reliable, and energy efficient long-term data storage, particularly for high-volume backups, long-life archives, disaster recovery/business continuity, compliance, and various other applications that include inactive data.

Various applications require tape-based write-once, read-many (WORM) storage solutions. Once information is written to tape, additional information can be added or read as often as needed but can never be changed, modified, or deleted. A number of strategies have been used to identify or designate a particular magnetic tape cartridge or cassette as a WORM or read-only cartridge. For example, many magnetic tape cartridges include on-board memory, such as an RFID chip, that may include information designating the cartridge as WORM or read-only media. In addition, cartridges may have a movable switch or slider, a removable tab, a permanent ridge or dimple, etc. that may designate the cartridge as a WORM or read-only cartridge when appropriately positioned, removed, detected, etc. Furthermore, information stored on the tape at a specific location, such as in a media information record/region (MIR) or other location at or near the beginning-of-tape (BOT) or end-of-tape (EOT), for example, may be used to designate the cartridge as a WORM or read-only cartridge. These strategies for designating the media as WORM or read-only apply to the entire cartridge. While suitable for many applications, these strategies may become less desirable as tape storage densities continue to increase.

While various error correction techniques may be used to reduce or eliminate data errors, deterioration or damage to the physical tape media, for example, may result in one or more regions being unreadable or exceeding an acceptable error rate. This typically results in retiring the cartridge, i.e. no additional data can be written to any remaining regions of the tape. This may result in a significant loss of storage capacity for any such cartridge particularly as storage densities continue to increase.

SUMMARY

Systems and methods for writing data on a tape having a plurality of partitions and accessed by a tape drive having an associated tape drive processor in communication with a host computer having an associated host processor include a tape and/or tape cartridge storing a read-only partition identifier associated with each of the plurality of partitions. The tape drive processor compares a requested write partition identifier with the stored read-only partition identifiers, and writes data to the requested write partition only if the associated read-only identifier indicates that the requested write partition is not a read-only partition.

In one embodiment, a method for archiving data from a host computer to one of a plurality of tapes having a plurality of substantially identical data partitions and loadable into a tape drive in communication with the host computer includes reading information identifying selected partitions marked as read-only associated with one of the tapes when the tape is mounted. The method may also include transferring the information into tape drive memory, receiving a write request from the host computer to write data to at least one of the partitions, and comparing the information in the tape drive memory to the write request to determine if the write request includes any partitions designated as read only. Various embodiments include returning an error to the host computer for partitions in the write request designated as read-only partitions by the information in the tape drive memory, and writing data to partitions in the write request that are not identified as read-only partitions by the information in the tape drive memory.

Embodiments according to the present disclosure may also include a computer data storage system having a tape drive with an associated processor and memory for writing and reading data on an associated tape having a plurality of substantially identical partitions for storing data. The tape drive reads information associated with the tape that includes a read-only identifier for each of the partitions and transfers the information to the memory. When the tape drive receives write requests from a host computer including at least one requested write partition, the tape drive determines whether to write data to the requested write partition based on the information in the memory. The system may also include a host computer in communication with the tape drive. The host computer requests a change to the read-only identifier associated with at least one partition. In response, the tape drive modifies the read-only identifier only if owner information associated with the read-only identifier matches owner information associated with the host computer.

In one embodiment, the computer data storage system includes a tape drive that stores the identifiers in at least one of the tape and an associated cartridge RFID tag. In various embodiments, the computer data storage system includes a tape drive with a tape drive processor that detects read/write errors associated with a designated partition and changes an associated identifier to mark the partition as read-only to prevent subsequent write attempts to the partition.

Embodiments according to the present disclosure provide various advantages. For example, systems and methods for writing data to tape according to the present disclosure allow the host computer to designate less than an entire tape cartridge as read-only. In addition, the host computer, application program, or other designation owner may subsequently change the read-only designation to a read/write designation allowing the designated portion of tape to be rewritten. Any hosts or applications that attempt to write to a write-protected area of the tape receive an error. Selective marking of one or more regions of the tape as read-only may also be used to identify media errors and prevent subsequent attempts to write data to those regions rather than retiring the entire cartridge. Read-only partition identification information can be stored within non-volatile storage on the tape and/or on the tape cartridge so that the information is maintained in the event of a power loss or tape drive reset. Associating an owner with each read-only partition identifier when the read-only partition identifier is set to identify a read-only partition and allowing only the owner to subsequently modify the read-only partition identifier protects data from being inadvertently overwritten by another host computer, host application, or even the owner host/application.

The above advantages and other advantages and features associated with various embodiments according to the present disclosure will be readily apparent from the following detailed description of the preferred embodiments when taken in connection with the accompanying drawings.

BRIEF DESCRIPTION OF THE DRAWINGS

FIG. 2 is a block diagram illustrating a representative physical tape layout for a tape having selective read-only partitions within a plurality of sections according to embodiments of the present disclosure:

FIG. 3 illustrates a logical tape layout for a tape section having a plurality of partitions that may each be designated as a read-only partition according to embodiments of the present disclosure;

FIG. 4 illustrates a physical tape layout for a tape section having a plurality of partitions with associated read-only partition information according to embodiments of the present disclosure;

DETAILED DESCRIPTION OF THE PREFERRED EMBODIMENT(S)

As those of ordinary skill in the art will understand, various features of the embodiments as illustrated and described with reference to any one of the Figures may be combined with features illustrated in one or more other Figures to produce embodiments of the present disclosure that are not explicitly illustrated or described. The combinations of features illustrated provide representative embodiments for typical applications. However, various combinations and modifications of the features consistent with the teachings of the present disclosure may be desired for particular applications or implementations.

Figure 1:
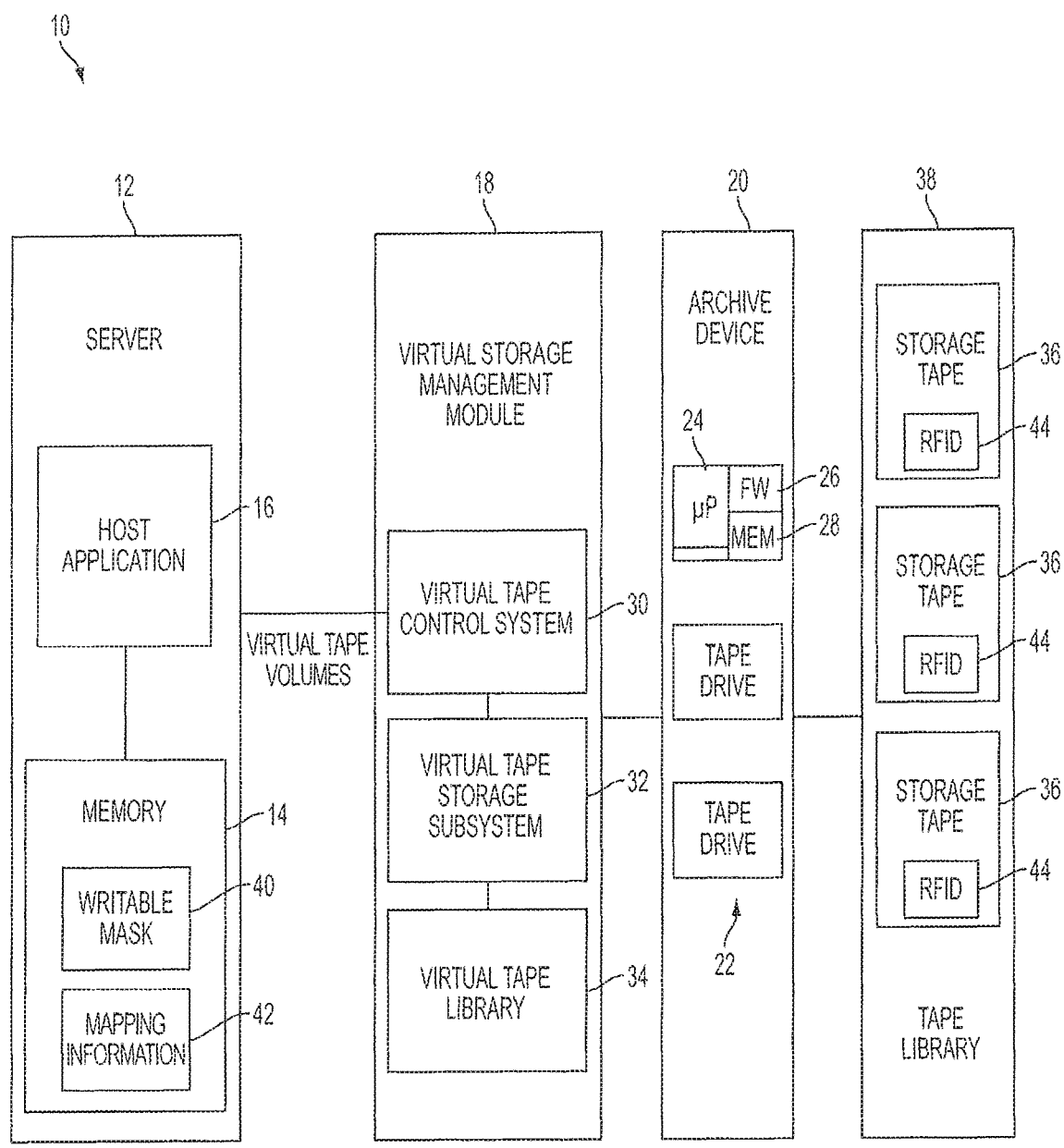
FIG. 1 is a block diagram illustrating operation of a representative system or method for storing data on a tape having a plurality of partitions with associated read-only partition information according to embodiments of the present disclosure.

Referring now to FIG. 1, a representative embodiment of a computer data storage system used in operation of a system or method for storing and retrieving data from a magnetic tape according to the present disclosure is shown. In the simplified functional block diagram of FIG. 1, system 10 includes a host computer or server 12 (e.g., a mainframe server) having an associated memory 14 and microprocessor that runs a host application 16. Host computer 12 may be used to manage or coordinate control of data storage in one or more logical data volumes that may also be referred to as virtual tape volumes (VTVs). An optional virtual storage management module 18 may be used in conjunction with one or more associated archive devices 20. Virtual storage management module 18 may reside within host computer or server 12, or may be located independent of the server 12 at any appropriate network location depending on the particular application and implementation, for example. Archive device 20 may include one or more data storage devices 22, such as magnetic tape drives, for example. Each storage device 22 may include an associated microprocessor 24 in communication with firmware (FW) 26 and various other types of memory 28.

Virtual storage management module 18 may perform various functions associated with storing and retrieving data from archive device 20. For example, virtual storage management module 18 may include a virtual tape storage control system (VTCS) 30 that communicates with host application 16 and directs a virtual tape storage subsystem (VTSS) 32. In turn, the VTSS routes host files either to the archive device 20 or to a virtual tape library 34. According to various embodiments of the present disclosure, VTVs or other logical volumes may be stored in a plurality of substantially identical partitions designated for data storage on magnetic media associated with one or more storage tapes or cartridges 36 that are housed within a tape library 38. Each cartridge may include an electronic data storage device for non-volatile or persistent storage of information independent of the magnetic media, such as an RFID chip or tag, for example. The electronic storage device associated with the magnetic tape cartridge or cassette may include information identifying one or more partitions as read-only partitions. The information may be read and transferred to memory 28 of tape drive 22 during loading or mounting of an associated tape, for example, as described in greater detail herein. Alternatively, or in combination, the read-only partition information may be stored on the tape and read during loading or mounting of the tape. In one embodiment, the read-only partition information is stored in a media information record or region (MIR) at or near the beginning of tape (BOT). In other embodiments, the read-only partition information may be stored at various other non-data regions of magnetic tape 36, or each partition may include a read-only flag or identifier at the beginning of the partition, for example. Similarly, owner information that identifies a host computer 12 and/or application 16 may be stored when a partition is designated as a read-only partition so that only the owner can subsequently modify the read-only status of that partition. Archive device 20 may be manually or automatically loaded with one of a plurality of magnetic tapes housed within the tape library 38 using any of a number of devices, including robotic assemblies that assist archive device 20 in selecting, mounting, and dismounting one of the storage tapes 36, for example. Virtual tape library 34 may be used to buffer or temporarily cache VTVs, which may ultimately be written to one or more partitions of storage tapes 36 as described in greater detail herein.

As also illustrated in FIG. 1, host computer 12 may include a writable partition mask 40 and mapping information 42 used to manage data storage on available partitions and allocate or associate at least one of a plurality of sections on a storage tape 36 with a logical data volume designated by host computer 12 via host application 16 or related software, for example. In operation, system 10 performs a method for storing or writing data on a magnetic tape 36 having a plurality of partitions and accessed by a tape drive 22 having an associated tape drive processor 24 in communication with a host computer 12 having an associated host processor that includes storing a read-only partition identifier associated with each of the plurality of partitions, comparing a requested write partition identifier with the stored read-only partition identifiers, and writing data to the requested write partition only if the associated read-only identifier indicates that the requested write partition is not a read-only partition. Requested write partitions may be identified by host computer 12 using writable mask 40. In one embodiment, archive device 20 and tape drive 22 receive writable partition mask 40 from host computer 12, which designates requested writable partitions on magnetic tape 36. Tape drive processor 24 determines whether to write data to the requested write partition(s) based on the read-only information previously stored in memory 28 during loading or mounting of tape 36. Tape drive processor 24 writes data to partitions in the write request that are not identified as read-only partitions by the information associated with tape and transferred to tape drive memory 28, and returns an error to host computer 12 for partitions in the write request designated as read-only partitions by the information in tape drive memory 28.

Referring now to FIG. 2, a diagram illustrating a physical tape layout for a magnetic tape having a plurality of sections configurable by a host computer with each section including a plurality of partitions that may be individually identified as read-only partitions according to embodiments of the present disclosure is shown. Magnetic tape 36 generally includes a beginning-of-tape (BOT) area or region 50, an end-of-tape area 52 and a data area 54. BOT 50 is a physical feature of magnetic tape 50 that can be used by tape drive 22 to detect the beginning of the data area 54. BOT 50 may also generally refer to the leader portion of magnetic tape 36 that allows the tape to be loaded, threaded through the transport and take-up reel and advanced to data region 54 for subsequent reading or writing data when the volume is mounted. Tape 36 may include a media information record or region (MIR) 48 that may include a read-only partition identifier associated with each of the plurality of partitions on tape 36. MIR 48 may be positioned within or near BOT region 50 or may be placed at any other non-data region of tape 36. In one embodiment, read-only partition identifiers are represented by a bit mask in MIR 48 having a bit representing a read-only status for a corresponding partition on tape 36. Read-only partition information may be stored in more than one location on tape 36 depending on the particular application and implementation.

Tape 36 also includes an EOT region 52 used by tape drive 22 to detect the end of data region 54 and/or end of tape. Traditional tape drives read/write data to the tape by moving the tape from BOT 50 to EOT 52 before reversing the direction of tape travel from EOT 52 to BOT 50 to read/write data in a serpentine fashion. In contrast, various embodiments for archiving data according to the present disclosure include reversing tape direction at section boundaries to read or write data in a serpentine fashion within at least one section associated with a logical volume designated by the host computer as described in greater detail herein. However, use of read-only partition information according to embodiments of the present disclosure is generally independent of the presence or number of sections associated with a particular tape, i.e. read-only partition information may be used with tapes that have only a single section or do not have designated sections separate from the partitions.

As also shown in FIG. 2, magnetic tape 36 includes a data area 54 that may be divided into a plurality of sections 60, 62, 64, 66. For applications having host-configurable sections, each section 60, 62, 64, 66 extends vertically substantially across the width of tape 36. The predetermined number of sections associated with magnetic tape 36 (four in this example) cumulatively extend across substantially the entire data portion 54 from MIR 48 or BOT 50 to EOT 52. In one embodiment, magnetic tape 36 is implemented by a ½" wide magnetic tape having a data portion length of about 279 meters with each section 60, 62, 64, 66 having a section length 70 of about 69 meters. Sections 60, 62, 64, and 66, each include a plurality of partitions that may be each be designated as a read-only partition as generally illustrated and described with respect to FIGS. 3-6.

FIG. 3 is a diagram illustrating a logical magnetic tape layout for a representative tape section that includes a plurality of partitions that may be designated as read-only according to embodiments of the present disclosure. Representative tape section 60 includes a plurality of partitions that may be generally vertically stacked or arranged across the width of tape 36 as generally represented by partitions 80, 82, 84, and 86. In one embodiment, tape 36 includes automatically linked partitions (ALPs) that include information for identifying a logically adjacent partition such that reading or writing from a designated partition to the logically adjacent partition is controlled by the tape drive processor 24 (FIG. 1) rather than the host computer 12 (FIG. 1) using requested write partitions identified by writable mask 40 (FIG. 1) that may be communicated from host computer 40 and stored in memory 28. Requested write partitions identified by writable mask 40 are compared by tape drive processor 24 using control logic within firmware 26 to read-only information stored in tape drive memory 28 to determine whether to write data to the requested write partition. Tape drive processor 24 writes data to partitions in the write request that are not identified as read-only partitions by the information in the tape drive memory 28 loaded from MIR 48 and/or RFID 44 during mounting of the tape. An error is returned to host computer 12 for any partitions in the write request mask 40 that are designated as read-only partitions by the information in tape drive memory 28.

As also illustrated in FIG. 3, for applications that divide the partitions into one or more configurable sections, representative partitions 80, 82, 84, 86 (and all intervening partitions not explicitly illustrated) extend substantially entirely across the length of their associated section 60. The number of sections per tape and the number of partitions per section may vary by application and implementation.

As illustrated in FIGS. 1-3, tape drive processor 24 reads information identifying selected partitions as read-only partitions associated with one of the magnetic tapes 36 when the tape is mounted. The information may be stored in an electronic storage device associated with the tape cartridge that is independent of magnetic tape 36, such as RFID 44, for example. Alternatively, or in combination, read-only partition information may be stored on magnetic tape 36 within MIR 48 or within individual partitions 80, 82, 84, and 86, for example. The read-only partition information for each of the plurality of partitions may be transferred from RFID 44 and/or MIR 48 into tape drive memory 28 for subsequent use in writing data to magnetic tape 36. Host computer 12 uses mapping information 42 and writable mask 40 to communicate a write request to write data to at least one of partitions 80, 82, 84, 86, any of which may be designated as read-only by associated read-only partition information now stored in tape drive memory 28. Writable mask 40 may also be stored in tap drive memory 28 for subsequent use in writing data to partitions 80-86. Tape drive processor 24 compares the read-only partition information in tape drive memory 28 to the writable mask 40 to determine if the write request includes any partitions designated as read-only partitions. Tape drive processor 24 writes data to partitions 80-86 included in the write request that are not identified as read-only partitions by the read-only partition information in tape drive memory 28. Tape drive processor 24 returns an error to host computer 12 for partitions in the write request designated as read-only partitions by the read-only partition information in tape drive memory 28 and does not write data to those partitions.

In various embodiments of system 10, tape drive 22 may also store owner information to identify host computer 12, host application 16, and/or tape drive 22 associated with each partition designated as a read-only partition to identify the device or application that designated a particular partition as a read-only partition. Owner information may be used to allow only an owner of a partition previously designated as a read-only partition to change the read-only designation. Owner information may be stored in memory 14, electronic storage device 44, and/or MIR 48, for example. Various other strategies may be employed to restrict modification of a read-only status for one or more partitions. For example, permission levels may be associated with designating a particular partition as a read-only partition such that any device or application having a designated permission level may subsequently modify a previously designated read-only partition.

Tape drive processor 24 performs various read/write data verifications when transferring data to/from magnetic tape 36 that may vary by application and implementation as well known. If tape drive processor 24 detects an unacceptable number of errors during reading and/or writing data to a designated partition 80-86 of magnetic tape 36, the read-only partition information associated with the designated partition may be changed to mark the partition as a read-only partition and prevent subsequent write attempts to that partition. For example, if tape processor 24 detects errors associated with reading and/or writing data to a bad partition, such as partition 82, tape processor 24 and/or host 12 may identify bad partition 82 as a read-only partition to prevent subsequent writing to bad partition 82. Data would then continue to be written to the logically adjacent partition specified in the writable mask 40 and/or within the partition information that automatically links logically adjacent partitions. In contrast to various prior art strategies that would retire tape 36 upon encountering such errors, embodiments according to the present disclosure continue to allow reading/writing of data associated with other partitions 80, 84, 86, etc. on tape 36 so that the tape can continue to be used by system 10.

Figure 5:
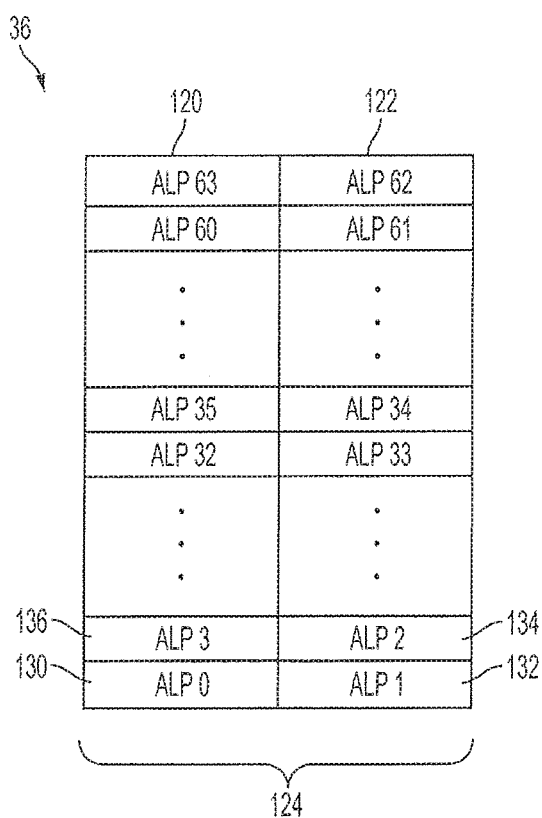
FIG. 5 illustrates a logical tape layout for a tape having multiple sections each having multiple partitions associated with a single logical volume according to embodiments of the present disclosure.

FIG. 4 is a diagram illustrating a physical magnetic tape layout for a representative logical volume having two sections each having a plurality of partitions that may be designated as read-only partitions according to various embodiments of the present disclosure. In the representative example of FIG. 4, logical volume 90 includes adjacent tape sections 64, 66 each having a plurality of partitions as generally illustrated in FIGS. 3 and 5. As previously described, in applications that have host-configurable sections, host computer 12 designates the number of sections to be included in a particular logical volume 90 to balance data access time and storage capacity of a particular volume. For example, defining or associating a logical volume with a single section, such as illustrated in FIG. 3, would result in a smaller available storage capacity for that logical volume and faster data access than associating two (or more) sections with the logical volume as illustrated in FIG. 4, resulting in twice the storage capacity but longer data access times.

As also shown in FIG. 4, magnetic tape 36 generally includes a plurality of data bands, generally represented by data bands 92, 94. Each data band may include a plurality of data tracks, generally represented by tracks 96, for storing data. Tape 36 may also include one or more servo tracks (not shown) that may be used in aligning the read/write heads as known. Data written to a single partition may be spread across multiple tracks within sections 64, 66 associated with a logical data volume 90, depending on the particular size of the tape, number of partitions, number of sections, etc. However, each partition is recorded in only one section. For example, partitions 80, 82 may include data recorded on tracks 100, 102, and 104, while partitions 84, 86 may include data recorded on tracks 110, 112, and 114. As generally indicated in FIG. 4, the tape drive controls direction of travel of tape 36 to reverse tape direction at section boundaries associated with a logical volume to read or write data within the logical volume in a serpentine fashion. For example, track 100 is read/written from section 64 to section 66 and the tape reverses direction to read/write track 102 from section 66 to section 64, where tape direction is again reversed to read/write track 104 from section 64 to section 66. Of course, the tape sections and partitions may be allocated such that data is recorded in a single pass per partition, or some other number of passes per partition depending on the particular application and implementation.

FIG. 5 illustrates a logical tape layout for a tape having multiple sections each having multiple partitions with associated read-only identifiers or information according to various embodiments of the present disclosure. Similar to logical volume 90 illustrated with respect to the physical layout of tape 36 in FIG. 4, logical volume 124 of FIG. 5 includes two adjacent sections 120, 122. Each section 120, 122 includes a plurality of partitions 130, 132, 134, 136, etc. As shown in FIGS. 3 and 5, each partition 80, 130, etc. fills the width of an associated section 60, 120, respectively, along a corresponding length of tape 36. Partitions 130, 132, 134, 136 are logically adjacent and also consecutively numbered in a serpentine fashion in this example. However, logically adjacent partitions may be physically separated on tape 36 and may not be consecutively numbered. Similarly, in applications that do not include multiple sections 120, 122, partitions 130, 132 134, 136, etc. would be consecutively numbered and extend across the entire data area. Each partition 130, 132, 134, 136, etc. may have an associated read-only status identifier, bit, or flag to designate the corresponding partition as a read-only partition as previously described.

Figure 6:
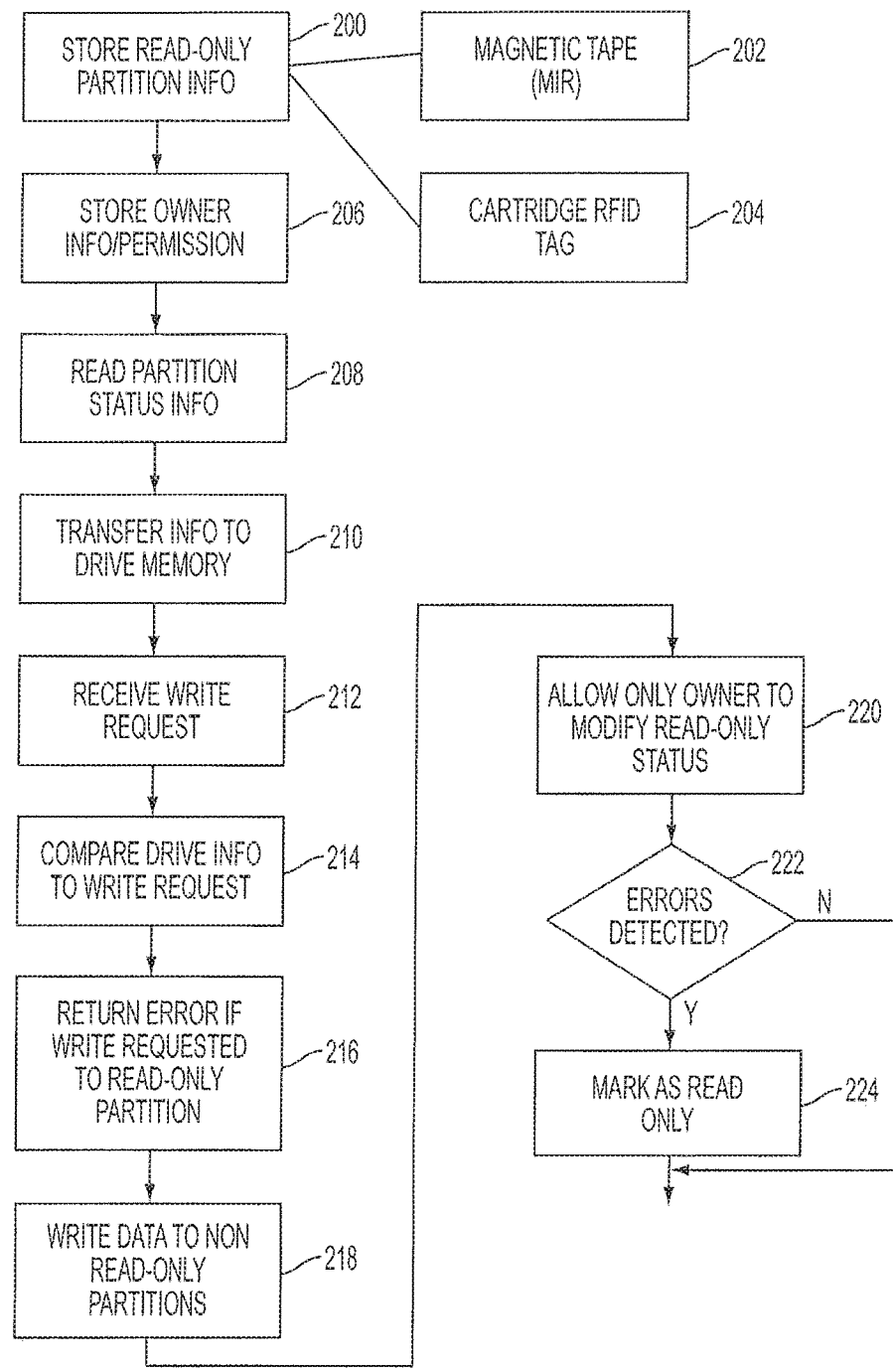
FIG. 6 is a simplified block diagram or flowchart illustrating operation of a system or method for storing data on a magnetic tape having partitions that can be designated as read-only according to embodiments of the present disclosure.

FIG. 6 is a flow chart illustrating operation of one embodiment of a system or method for writing data to a magnetic tape having selectively designated read-only partitions according to the present disclosure. As those of ordinary skill in the art will understand, the functions represented by the block diagram may be performed by software and/or hardware. Depending upon the particular processing strategy, such as event-driven, interrupt-driven, etc., the various functions may be performed in an order or sequence other than illustrated in the Figure. Similarly, one or more steps or functions may be repeatedly performed, although not explicitly illustrated. Likewise, various functions may be omitted depending on the particular implementation. Various functions known to those of skill in the art may not be explicitly illustrated or described, but are implied by the illustrated blocks or modules. In one embodiment, the functions illustrated are primarily performed by control logic implemented by software, instructions, or code stored in a computer readable storage medium and executed by a microprocessor-based controller to control operation of the system. While generally illustrated and described with respect to a magnetic tape drive, those of ordinary skill in the art will recognize that various functions may be applicable to various other types of peripheral storage devices.

As generally illustrated in FIG. 6, a system or method for archiving data from a host computer to one of a plurality of magnetic tapes having a plurality of substantially identical data partitions and loadable into a tape drive in communication with the host computer may include storing information associated with each of the plurality of partitions in non-volatile or persistent storage as represented by block 200. This may include storing the read-only partition information to at least one of the magnetic tape 202 and a magnetic tape cartridge 204 in an RFID tag or chip or other non-volatile memory, for example. Owner or permission information associated with each partition designated as a read-only partition may also be stored as represented by block 206.

The system or method also include reading previously stored read-only partition information identifying selected partitions as read-only partitions when the tape is mounted as represented by block 208. Associated permission or owner information may also be detected or read. The read-only partition information and any associate permission or owner information may be transferred into the tape drive memory for subsequent use in writing data to one or more partitions as represented by block 210.

During operation, the tape drive receives a write request from the host computer to write data to one or more partitions as represented by block 212. The read-only partition information previously transferred to the tape drive memory is compared to partitions identified in the write request to determine if the write request includes any partitions designated as read-only as represented by block 214. An error is returned to the host computer for partitions in the write request designated as read-only partitions by the information in the tape drive memory as represented by block 216. The system or method continue with writing data to partitions in the write request that are not identified as read-only partitions by the information in the tape drive memory as represented by block 218.

In various embodiments, the system or method allow only an owner of a partition designated as a read-only partition to change the read-only designation as represented by block 220. Alternatively, or in combination, any host computer or process having an appropriate permission level or code may be allowed to modify the read-only status indicator of a particular partition. The system or method may also include detecting errors associated with reading and/or writing data to a designated partition and changing the read-only partition information associated with the designated partition to mark the partition as a read-only partition as represented by blocks 222, and 224, respectively.

As the previously described representative embodiments illustrate, systems and methods for writing data to magnetic tape according to the present disclosure allow the host computer to designate less than an entire tape cartridge as read-only. For example, in one embodiment any one or more of 520 partitions each having a capacity of 9 GB may be individually designated as a read-only partition. In addition, the host computer, application program, or other designation owner may subsequently change the read-only designation to a read/write designation allowing the designated portion of tape to be rewritten. Any hosts or applications that attempt to write to a write-protected area of the tape receive an error so that data integrity is maintained. Selective marking of one or more regions of the tape as read-only may also be used to identify media errors and prevent subsequent attempts to write data to those regions rather than retiring the entire cartridge. Storing read-only partition identification information within non-volatile storage on the tape and/or cartridge maintains the information in the event of a power down or tape drive reset. In addition, associating an owner with each read-only partition identifier when the read-only partition identifier is set to identify a read-only partition and allowing only the owner to subsequently modify the read-only partition identifier protects data from being inadvertently overwritten by another host computer, host application, or even the owner host/application.

While the best mode has been described in detail, those familiar with the art will recognize various alternative designs and embodiments within the scope of the following claims. While various embodiments may have been described as providing advantages or being preferred over other embodiments with respect to one or more desired characteristics, as one skilled in the art is aware, one or more characteristics may be compromised to achieve desired system attributes, which depend on the specific application and implementation. These attributes include, but are not limited to: cost, strength, durability, life cycle cost, marketability, appearance, packaging, size, serviceability, weight, manufacturability, ease of assembly, etc. The embodiments discussed herein that are described as less desirable than other embodiments or prior art implementations with respect to one or more characteristics are not outside the scope of the disclosure and may be desirable for particular applications.

What is claimed is:

1. One or more non-transitory machine-readable media storing instructions which, when executed by one or more processors, cause performance of operations comprising:
    writing, by a drive processor, data to a first partition of a plurality of partitions in a storage medium, the first partition being associated with a respective read-only partition identifier with a value indicating that the first partition is designated as a read-write partition;
    detecting, by the drive processor, an unacceptable number of errors during reading and/or writing to the first partition; and
    responsive to detecting the unacceptable number of errors during reading and/or writing to the first partition:
        modifying the value of the respective read-only partition identifier to an updated value that designates the first partition as a read-only partition.

2. The media of claim 1 wherein modifying the value of the read-only partition identifier associated with the first partition to an updated value is also responsive to determining that the value of the read-only identifier associated with the first partition designates the first partition as a read-write partition.

3. The media of claim 1 wherein the operations further comprise:
receiving a request to write second data to a second partition of the plurality of partitions in the storage medium;
accessing a second read-only partition identifier associated with the second partition;
determining whether the second read-only partition identifier associated with the second partition designates the second partition as a read-only partition; and
responsive to determining that the second partition is designated as a read-only partition:
preventing writing the second data to the second partition.

4. The media of claim 3 wherein the operations further comprise writing the second data to a third partition of the plurality of partitions in the storage medium that is logically adjacent to the second partition and designated as a read-write partition by a value of an associated read-only partition identifier.

5. The media of claim 1 wherein the operations further comprise preventing writing data to the first partition subsequent to modifying the value of the respective read-only partition identifier associated with the first partition to designate the first partition as a read-only partition.

6. The media of claim 1 wherein the operations further comprise reading data from the first partition subsequent to modifying the value of the respective read-only partition identifier associated with the first partition to designate the first partition as a read-only partition.

7. The media of claim 1 wherein the operations further comprise partitioning the storage medium into the plurality of partitions including the first partition, each of the plurality of partitions configured for storing data readable by the drive processor.

8. The media of claim 1 wherein the operations further comprise storing information to identify a host computer, a host application, and/or a drive associated with each read-only partition identifier designating the respective partition of the storage medium as a read-only partition.

9. The media of claim 8 wherein the stored information to identify the host computer, the host application, and/or the drive associated with each read-only partition identifier designating the respective partition of the storage medium as a read-only partition identifies the host computer, host application, and/or drive that designated the respective partition as a read-only partition.

10. The media of claim 9 wherein the operations further comprise preventing any host computer, host application, or drive other than the host computer, host application, or drive that designated a particular partition of the storage medium as a read-only partition from modifying a value of the read-only partition identifier associated with the particular partition.

11. The media of claim 1 wherein the operations further comprise storing a permission level associated with each partition of the storage medium associated with a read-only partition identifier designating the respective partition as a read-only partition that specifies that only a host computer, a host application, or a drive having at least the stored permission level may modify the value of the read-only partition identifier associated with the respective partition.

12. The media of claim 11 wherein the operations further comprise preventing any host computer, host application, or drive not having at least the stored permission level associated with a particular partition of the storage medium associated with a read-only partition identifier designating the particular partition as a read-only partition from modifying a value of the read-only partition identifier associated with the particular partition.

13. The media of claim 1 wherein the read-only partition identifier is one of a plurality of read-only partition identifiers stored in a media information region (MIR) of the storage medium.

14. The media of claim 1 wherein the read-only partition identifier is one of a plurality of read-only partition identifiers stored in a non-data region of the storage medium.

15. The media of claim 1 wherein the read-only partition identifier is stored within the first partition of the storage medium.

16. The media of claim 1 wherein the read-only partition identifier is one of a plurality of read-only partition identifiers stored in an electronic storage device associated with a cartridge that houses the storage medium, the electronic storage device being independent of the storage medium and also readable by the drive processor.

17. The media of claim 1 wherein the read-only partition identifier is one of a plurality of read-only partition identifiers stored in an electronic memory coupled with the drive processor that reads and writes data on the storage medium, the electronic memory being independent of the storage medium and not housed with the storage medium.

18. The media of claim 1 wherein the read-only partition identifier is one of a plurality of read-only partition identifiers represented using a bit mask.

19. The media of claim 1 wherein the unacceptable number of errors is predetermined.

20. A method for reading and writing data on a storage medium, the method comprising:
partitioning a storage medium into a plurality of partitions, each of the plurality of partitions configured for storing data readable by a drive processor;
writing, by the drive processor, data to a first partition of the plurality of partitions in the storage medium, the first partition being associated with a respective read-only partition identifier with a value indicating that the first partition is designated as a read-write partition;
detecting, by the drive processor, a predetermined unacceptable number of errors during reading and/or writing to the first partition;
responsive to detecting the unacceptable number of errors during reading and/or writing to the first partition and determining that the first partition is designated as a read-write partition:
modifying the value of the respective read-only partition identifier to an updated value that designates the first partition as a read-only partition.

21. The method of claim 20 wherein modifying the value of the read-only partition identifier associated with the first partition to an updated value is also responsive to determining that the value of the read-only identifier associated with the first partition designates the first partition as a read-write partition.

22. The method of claim 20, further comprising:
receiving a request to write second data to a second partition of the plurality of partitions in the storage medium;
accessing a second read-only partition identifier associated with the second partition;

determining whether the second read-only partition identifier associated with the second partition designates the second partition as a read-only partition; and responsive to determining that the second partition is designated as a read-only partition:
  preventing writing the second data to the second partition.

23. The method of claim 22, further comprising: writing the second data to a third partition of the plurality of partitions in the storage medium that is logically adjacent to the second partition and designated as a read-write partition by a value of an associated read-only partition identifier.

24. A system, comprising:
one or more processors; and
memory storing instructions that, when executed by the one or more processors, cause the system to perform:
partitioning a storage medium into a plurality of partitions, each of the plurality of partitions configured for storing data readable by a drive processor;

writing, by the drive processor, data to a first partition of the plurality of partitions in the storage medium, the first partition being associated with a respective read-only partition identifier with a value indicating that the first partition is designated as a read-write partition;

detecting, by the drive processor, a predetermined unacceptable number of errors during reading and/or writing to the first partition;

responsive to detecting the unacceptable number of errors during reading and/or writing to the first partition and determining that the first partition is designated as a read-write partition:
  modifying the value of the respective read-only partition identifier to an updated value that designates the first partition as a read-only partition.

* * * * *